United States Patent [19]

Persson

[11] Patent Number: 4,759,288
[45] Date of Patent: Jul. 26, 1988

[54] PRINTER FOR A BAR CODE

[75] Inventor: Leif Persson, Lund, Sweden

[73] Assignee: Ecupan AB, Västra Frölunda, Sweden

[21] Appl. No.: 889,324

[22] Filed: Jul. 23, 1986

[30] Foreign Application Priority Data

Jul. 25, 1985 [SE] Sweden .................. 8503590

[51] Int. Cl.⁴ .............................. B41F 1/08
[52] U.S. Cl. ..................... 101/288; 156/584; 242/67.3 R; 101/57; 101/228
[58] Field of Search ................. 156/384, 584; 242/67.3 R; 101/288, 45–47, 56, 57, 228

[56] References Cited

U.S. PATENT DOCUMENTS

| | | | |
|---|---|---|---|
| 3,216,021 | 11/1965 | Stefonsson | 242/67.3 R |
| 4,116,747 | 9/1978 | Hamisch, Jr. | 101/288 |
| 4,264,396 | 4/1981 | Stewart | 101/288 |
| 4,432,830 | 2/1984 | Jue | 101/288 |
| 4,512,256 | 4/1985 | Schriber et al. | 101/228 |
| 4,544,437 | 10/1985 | Gibson | 101/288 |
| 4,560,292 | 12/1985 | Takahashi | 101/288 |
| 4,561,926 | 12/1985 | Hamisch, Jr. et al. | 101/288 |

FOREIGN PATENT DOCUMENTS

| | | |
|---|---|---|
| 0052848 | 6/1982 | European Pat. Off. |
| 7605410-5 | 5/1976 | Sweden |

*Primary Examiner*—William Pieprz
*Attorney, Agent, or Firm*—Ladas & Parry

[57] ABSTRACT

A printer, which is especially adapted for printing a bar code on label paper has a housing having a front panel with some operation buttons and a winding drawer having a protruding label table. The printer prints a bar code and alphanumeric numerals on a label which is fed to the label table for then being applied to goods. The printer also can be connected to an external computer or the like for obtaining the information to be printed on the label. The printer also has an internal processor and a memory for maintaining certain necessary information. The winding drawer has a winding roller and a deflection roller on a pivotable operation lever. The deflection roller deflects ground paper of the label paper over a dispenser edge in a first position of the operation lever, so that a label formerly on the ground paper is delivered straight ahead while the ground paper is deflected downwards to the winding roller operation. The lever and deflection roller also may be pivoted forwards to a second position, whereupon the ground paper including the labels can be delivered straight forwards as a long strip of labels maintained on the ground paper. By pulling out the winding drawer to an extended position and pivoting the operation lever and deflection roller to the second position, the labels on the ground paper also may be wound on the winding roller for later use. The printer also has one or several printing heads which are pivotable about 90° for cleaning printing points thereof. The printing heads are easily exchangeable by loosening only two screws.

4 Claims, 9 Drawing Sheets

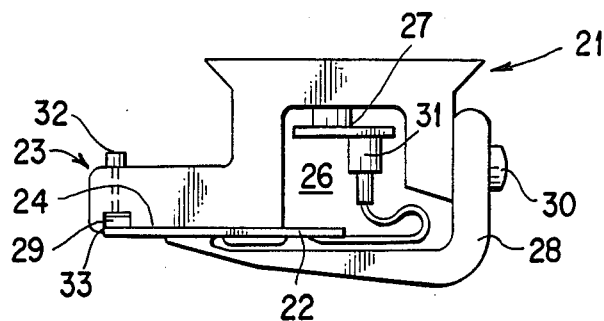
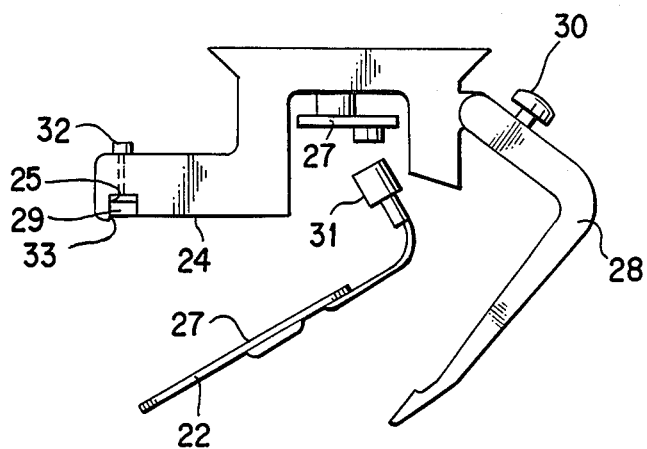

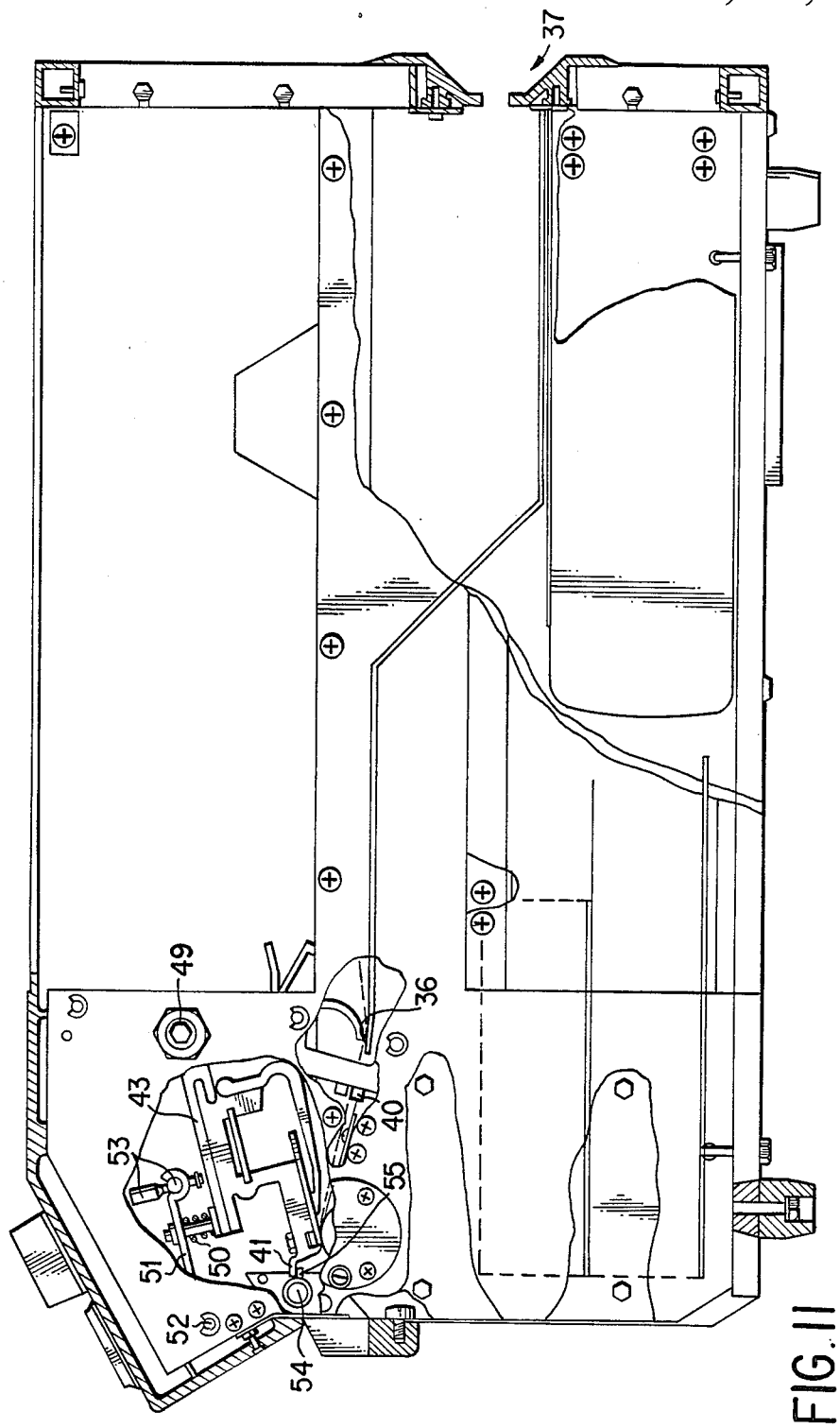

PRINTER FOR A BAR CODE

FIELD OF INVENTION

The present invention relates to a printer for a bar code. The invention relates more specifically to an improved printer for a bar code having the possibility of feeding the labels one at a time, in a continuous path or on a roller. The invention also relates to an improved printing head for such a printer.

PRIOR ART

Printers for bar codes are previously known in many different embodiments. The present invention specially relates to the printer disclosed in our U.S.- Pat. No. 4,659,416 issued Apr. 21, 1987 entitled "Label printer for EAN code", the contents of which is hereby included by reference.

A printer of this type prints a bar code comprising a number of bars having different widths and spaces. The bars and the spaces symbolize numerals which normally also are printed adjacent the code. Moreover, the label may be provided with letters and figures to display information about the goods, advertisments, messages etc. The principal for the bar code is that the code shall uniquely define the goods. Thus, each separate good has its own code. Normally, said code is printed on the packing at manufacturing. With certain types of goods, for example goods in bulk, it is however impossible to print a code directly on the packing of the goods. Thus, there is a need of a printer for a bar code which may be used in a shop, in a grocery etc. for labelling such goods.

The printer according to the present invention is constructed with a view to the demands placed on a bar code printer by the United States association "Automotive Industry Action Group, AIAG" for use within the US industry. This association has published definitions of a bar code label (Shipping/Parts Identification Label Standard) and the present printer is constructed for fulfilling said definitions and standard.

The printer according to the invention is also usable as an alphanumeric printer to print any other text.

The printers presently on the market use a printing technique in which both the bar code and the information about the goods is printed by means of a thermo printer on a thermo sensitive paper. Our above-mentioned printer according to the U.S. patent is such a thermo printer which is specially adapted for fast printing and for fulfilling the requirements of a grocery for e.g. price labelling goods in connection with an electronic scale for weighing food stuffs of different types. Said printer can print lines having a very homogenous width, which results in a bar code having a very high quality.

However, in the actual construction of printers presently on the market, the efforts have been to produce printers having good technical performance while the ergonomic or practical design of the printer has been put aside or has not been observed.

SUMMARY OF THE INVENTION

The object of the present invention is to provide a printer for a bar code which is easy to use, reliable and easy to handle.

More specifically, the invention relates to an improved construction for feeding or supplying code-printed label paper from the printer one label at a time and separated from a ground or web of the label paper or with successive labels maintained on the ground paper, either directly out of the printer or wound on a roller. Moreover, the invention relates to an improved construction of a support assembly for the printing head of the printer.

The printing head has a printing plate for putting points or lines on the paper and a mechanism for feeding the paper beyond the printing plate. The paper comprises a ground paper with labels or the like attached thereto. According to the invention, the labels are adapted to be supplied from the printer in three alternative ways: each label separate, as a strip or tape having the labels maintained on the ground paper or, again with the labels maintained the ground paper, as a winding on a winding roller.

The winding roller is in a winding drawer, which can be pulled out from in the front of a printer, whereby said three operations are achieved by different positions of the winding drawer. Preferably, the winding drawer comprises a deflector roller adapted, in a first position, for deflecting the path of the ground paper downwards over a dispenser edge so that the labels are fed straight fowards onto a label table, while the ground paper is collected on said winding roller. The deflector roller is also adapted, in a second position, so that the lables are not separated from the ground paper.

Preferably, the ground paper follows an essentially rectilinear path from a supply roller, below the printing plate, to the deflector roller and thence downwards, whereby exchange of paper is facilitated.

The printer is controlled by its own processor or micro computer, which, through an interface, is connected to other equipment, such as an external computer, an electronic scale, etc. Control buttons are gathered on a front panel which comprises a display window, a first button set for inputting information, a second button set for paper feed functions and a mode selector.

According to a feature of the invention, the printing plate is easily exchangeable and is retained by means of a releasable mechanism. The printing plate contacts a large cooling surface for heat dissipation and heat equalization. Several printing plates may be adapted beside each other and each is adjustable for proper contact with the surface of the paper.

BRIEF DESCRIPTION OF THE DRAWINGS

The invention is described in more details below by means of a preferred embodiment of the invention and by reference to the appended drawings.

FIG. 6 is a side view of the support unit for the printing head in the mounted position thereof.

FIG. 7 is a side view similar to FIG. 6 having the support unit in partly disassembled position.

FIG. 11 is a cross-sectional view of the printer and shows the journalling of the support unit of the printing head according to FIGS. 9 and 10.

DESCRIPTION OF THE PREFERRED EMBODIMENT

Figure 1:
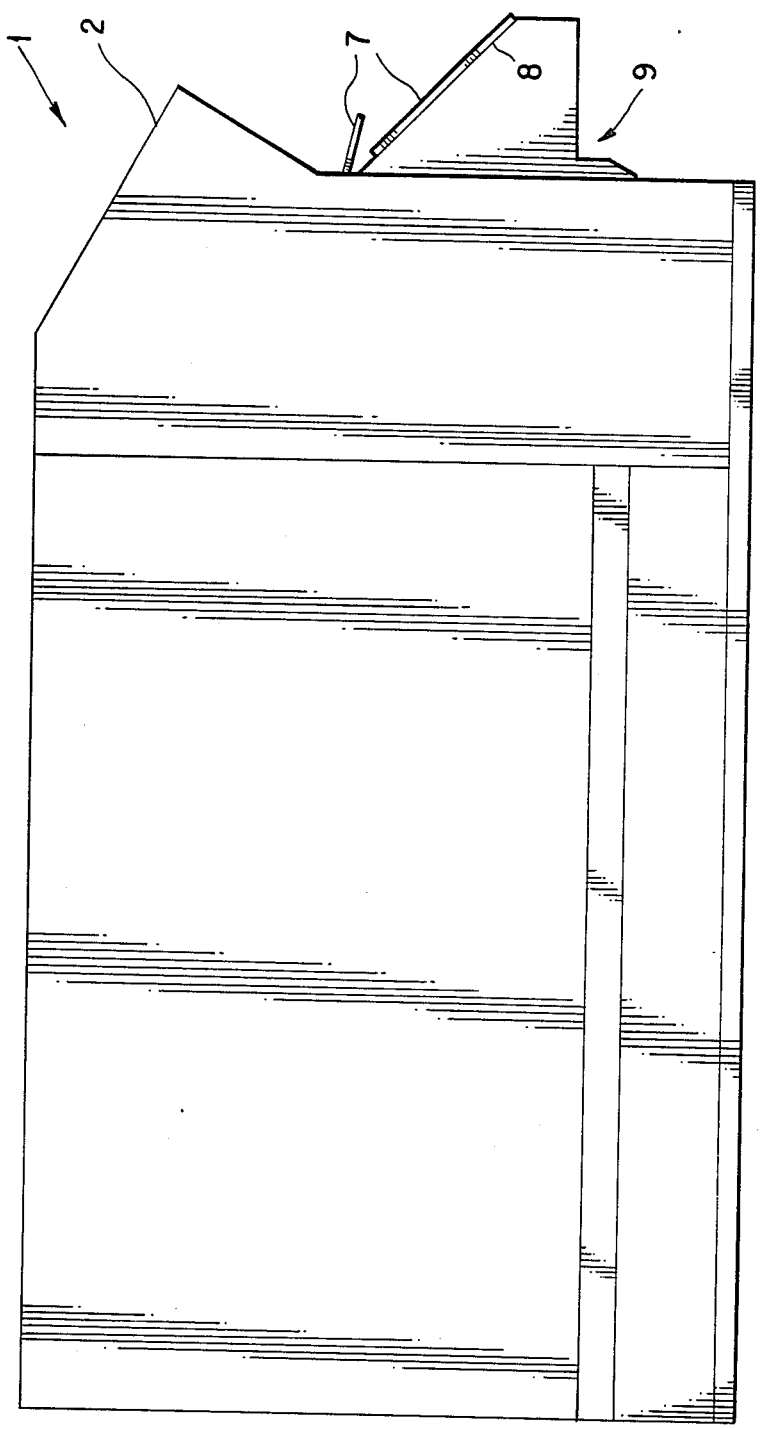
FIG. 1 is a side view of the printer according to the invention.
Figure 2:
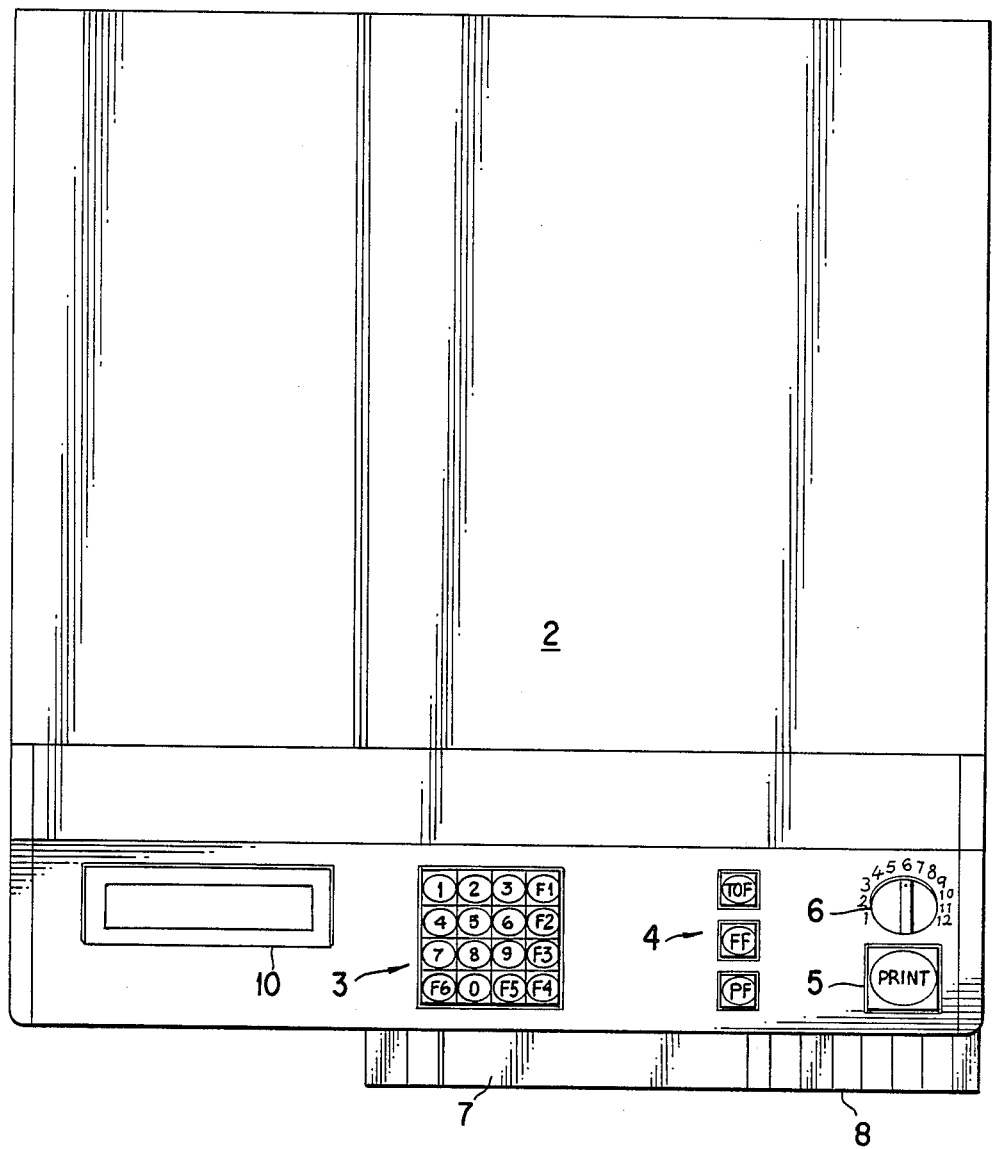
FIG. 2 is a plan view of the printer according to FIG. 1.

FIGS. 1 and 2 show the printer according to the invention from the side thereof and from above, respectively. The printer 1 comprises an outer housing 2 surrounding the printer on all sides thereof. At the front side the printer is provided with a number of buttons, and in the embodiment shown there is a group 3 of sixteen buttons designated 0–9 and F1–F6. These buttons are used for manual input of information if needed. However, normally the input of information to the printer takes place through an interface from e.g. an external computer or other electronic equipment. The printer is in turn equipped with a micro computer, controlling the operation of the printer in a manner well-known to a skilled person.

Furthermore, there is a second group 4 of buttons designated "TOF" (top of form), "FF" (form feed) and "PF" (paper feed). Another button "LOC" (local) may be included in said group. Said buttons control the paper feed and the connection of the printer to a line (on-line) and local, respectively. Finally, there is a button 5 labelled "PRINT" and a knob 6 having a scale 1–12. The desired operation or mode is adjusted by the knob 6, such as to which computor the printer is connected, different protocols, etc. A label is printed by pushing the "PRINT" button.

Moreover, the front side of the housing is provided with a display window 10 for displaying relevant information, which may be the information to be printed on the label or operation information, such as error messages for the printer.

In the figure there is only shown an example of the design of the interface between man and machine. Depending on the application, said interface can be varied to include only a display window and the button "PRINT" and possibly the knob 6, the operation selector, which can have fewer positions than twelve, e.g. two. In such an application it is presumed that the printer is completely controlled by an internal program or an external computer or similar. In other applications there are further buttons in said interface, which makes possible a more or less complete programming from the button table.

The label 7 is delivered through an opening in the front side of the housing, as shown in FIG. 1 and is attached to a supply table 8 or delivery table, where the user can take the label and manually apply it to the goods. Alternatively, the printer may be provided with an automatic applicator device, which attaches the label to the goods.

Figure 3:
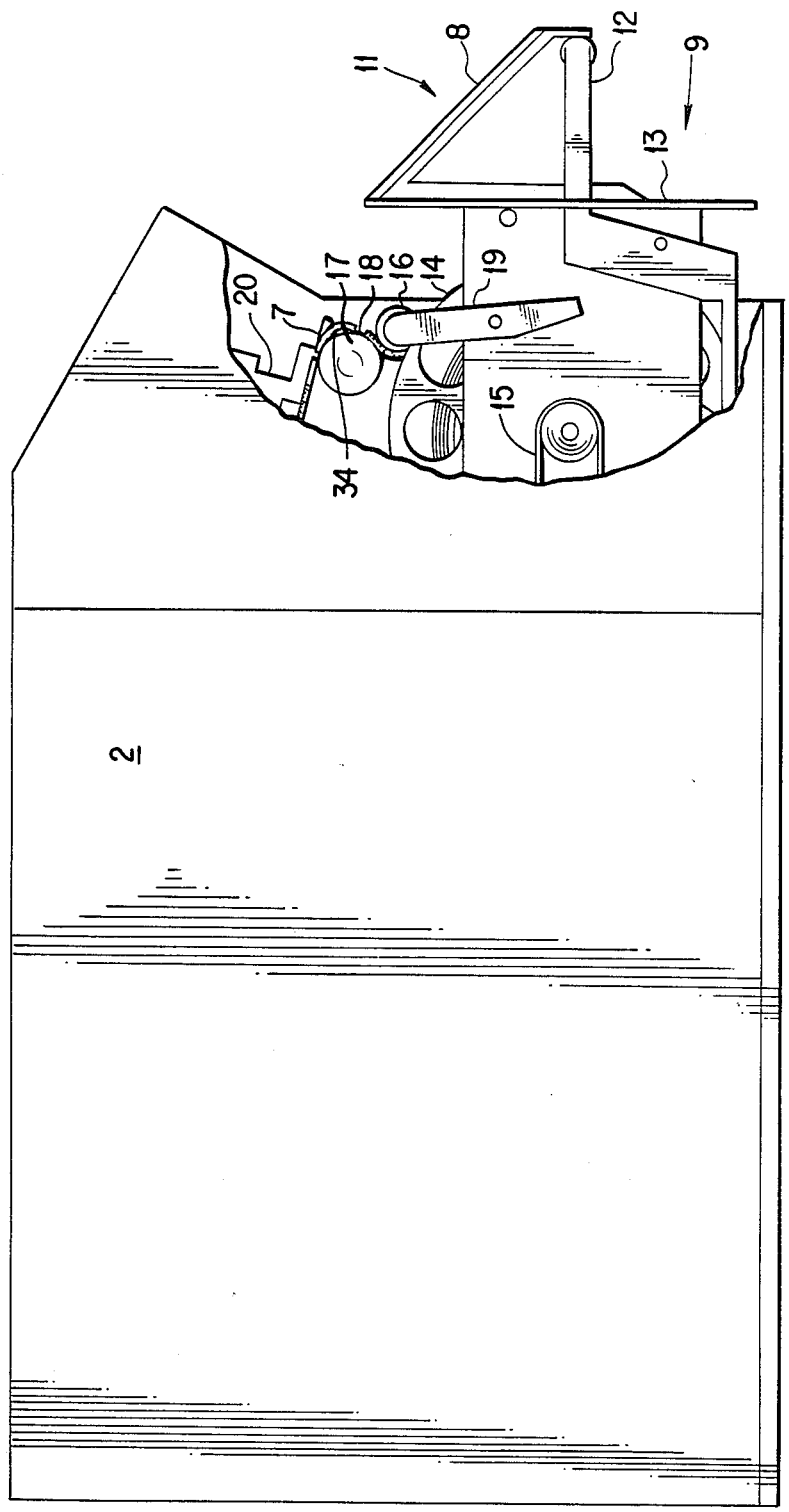
FIG. 3 is a view similar to FIG. 1 but partly in cross-section for showing the feed mechanism for the label.

The delivery table 8 is positioned on a winding drawer at 9, which is extractable as described more closely with reference to FIG. 3.

The delivery table may also be mounted directly to the front side of the printer.

In FIG. 3 the winding drawer is shown in more detail. The winding drawer at 9 comprises an outer portion at 11, which extends from the drawer and, at the upper side thereof, comprises the delivery table 8 and, at the lower side thereof, is provided with a hand grip 12. The delivery table 8 is inclined and forms an angle of about 45° towards the horizontal in order to facilitate the removal of a label delivered to the table 8. Finally, the outer portion 11 is provided with a vertical plate 13, which connects the outer portion of the winding drawer at 9 to the housing of the printer with a small space at the upper end thereof, in which space a label may be delivered.

By lifting the hand grip 12, a lock (not shown) is released and the winding drawer can be pulled out. In FIG. 3, the winding drawer is shown in a partially extended position. In the winding drawer there is a winding roller 14 driven by a drive belt 15. Furthermore, there is a deflection roller 16. The printer is provided with a drive roller 17 powering the label 7, which in turn is positioned on a ground paper 18.

The deflection roller 16 is positioned on a pivotable operation lever 19. The lever 19 is pivotable between the positions shown in FIG. 3 and FIG. 4. A dispenser edge 34 breaks the path of the ground paper 18 so that the label 7 is delivered straight ahead to the delivery table 8 while the ground paper is deflected downwards and wound on the winding roller 14.

At certain occasions it is desired to allow the labels also to be collected on the winding roller. This is made possible in a simple manner by allowing the winding drawer 9 to take a second position shown in FIG. 4. In this position, the winding drawer is extracted to its outer position. The deflection roller 16 is moved aside to the right in FIG. 4 and the ground paper having the labels positioned thereon can be wound on the winding roller.

Sometimes it is also desired to allow the printer to feed the labels from the printer on the ground paper. This is also possible by the printer according to the present invention. It is achieved with the winding drawer in the position shown in FIG. 3 or with the winding drawer completely pushed in, but having the deflection roller moved aside to the position shown in FIG. 4. The ground paper having the labels thereon can then be delivered from the printer.

The winding drawer 9 makes possible a simple exchange of paper. At the exchange of paper, the housing of the printer is removed and a new label roller is applied in place in the printer and the ground paper including the labels is guided through the printer in an essentially rectilinear path to the extracted winding drawer 9. In this position it is easy to attach the ground paper to the winding roller 14, since it is easily available outside the printer. It is no longer necessary to move the ground paper around deflection rollers of different types as in previously known printers, but the ground paper will automatically be deflected by the deflection roller when the winding drawer is inserted to its normal position. The ground paper follows an essentially rectilinear path from the supply roller to the winding roller (in extracted position), which very much facilitates the exchange of paper.

Figure 4:
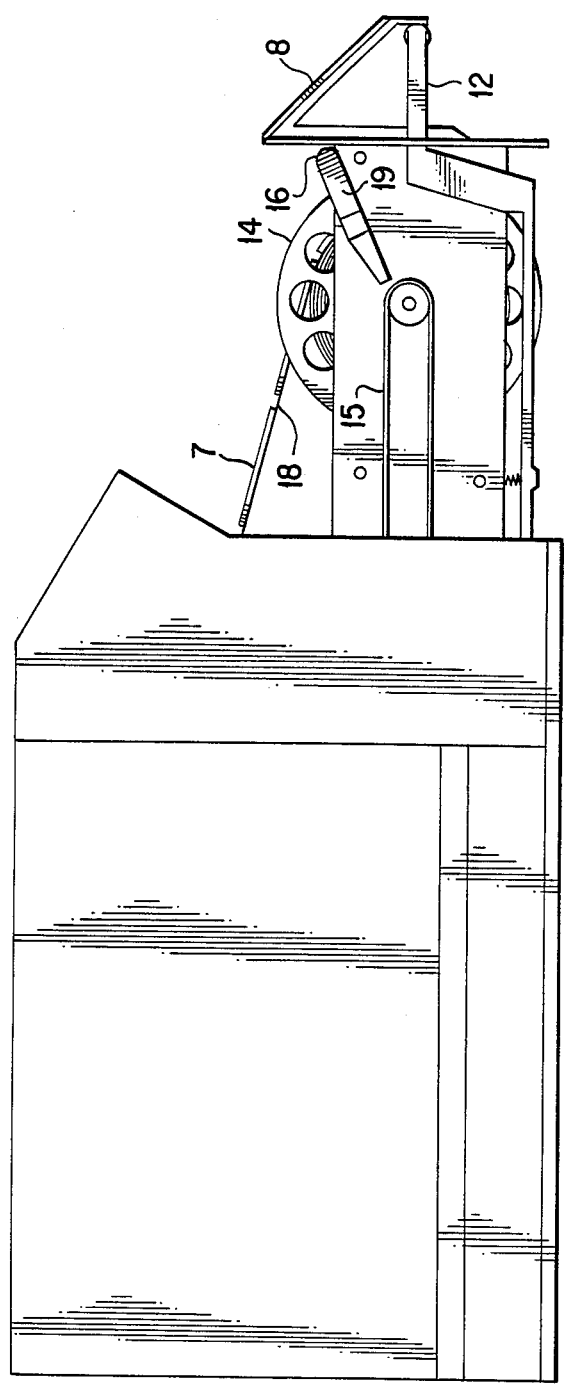
FIG. 4 is a side view similar to FIGS. 1 and 3 but having the feed mechanism in another position.
Figure 5:
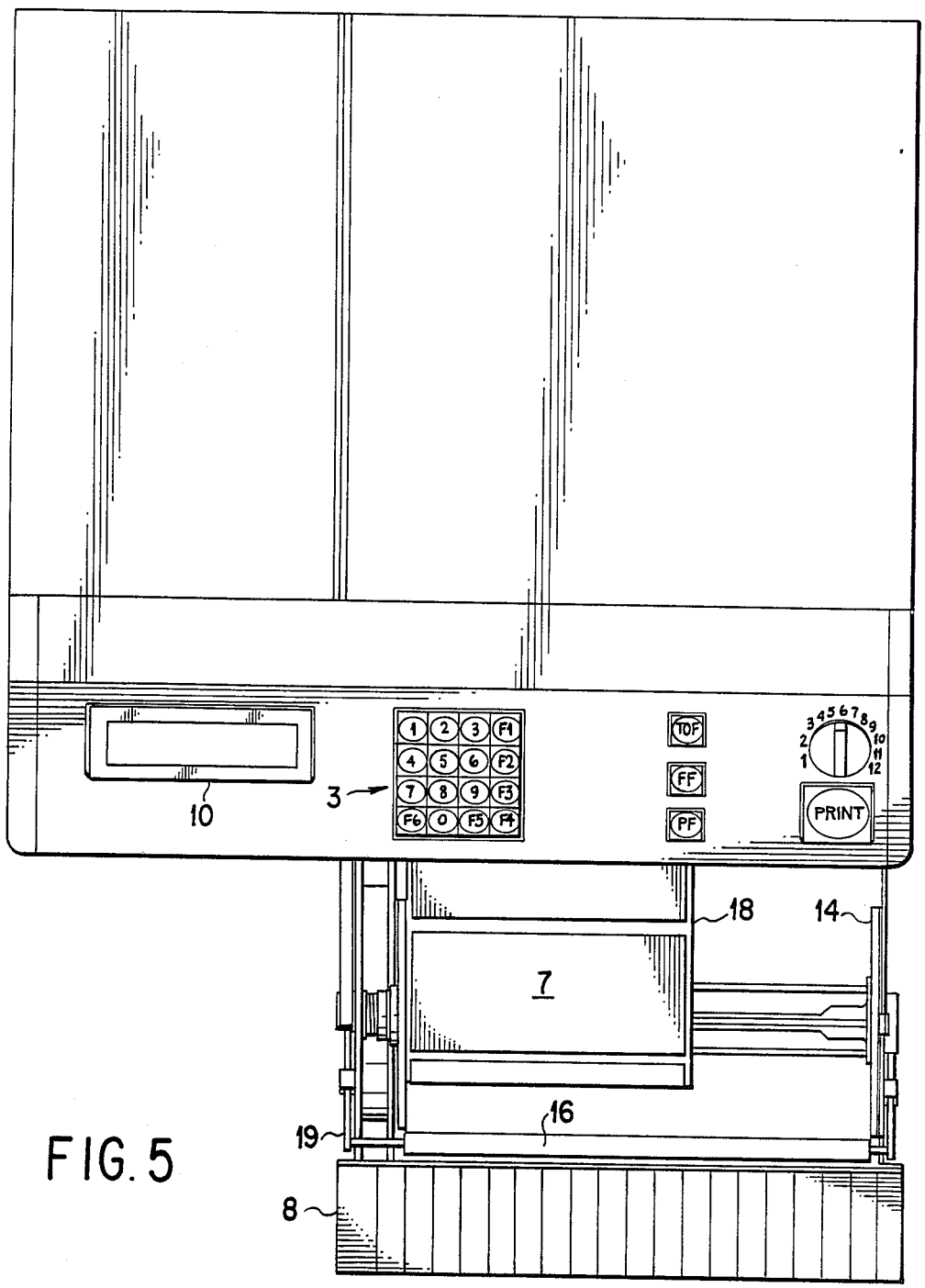
FIG. 5 is a plan view similar to FIG. 2 having the feed mechanism in the position according to FIG. 4.

In FIG. 5, the winding drawer is shown from above in the extracted position according to FIG. 4. The winding drawer may have a width which is greater than the paper width, used in order to make possible the use of still wider paper if required.

FIGS. 6 and 7 show a first embodiment of the support of the printing head. In FIG. 3, the position of the printing head 20 is shown immediately above the driving roller 17. The printing head 20 comprises a support 21 and a substrate or a printing plate 22 having printing points and electronics. The printing points contact a thermo paper at operation, which paper is moved by the mechanism of the printer past the printing points. Thus, each printing point writes a row of points or lines, together forming the desired bar code or the text. It is also possible to use ordinary paper and a heat sensitive carbon paper positioned between the paper and the printing points, whereby the carbon paper transfers the desired bar code or the text to the paper (transfer printing). Even other types of printing techniques may be used.

It is known that most errors on a printer of this type arise in connection with the printing points. It is the printing points which provide the color on the thermo paper or similar by heating the printing points with an electric current, the size and duration of which are controlled by the micro computer of the printer. The printing points contact the paper and are thus exerted to a mechanical wear and may easily be contaminated of the adhesive used for attaching the labels to the ground paper. Consequently, the printing points are worn both electrically and mechanically.

When a printer ceases to operate, it is in most of the cases only the printing head which is required to be exchanged or cleaned. Thus, it is sufficient to send only the printing head for reparation or, for avoiding operation stops, exchange it on location for later delivering to service. However, in previously known printers it is difficult to access the printing head and disassembling it or cleaning it.

The present printer is constructed for enabling a simple cleaning and replacement of the printing head. Thus, the control panel is removable and may be placed above the housing 2 and the printing head will be available. The printing head is pivotable upwards 90° so that the printing points will be directed against the user for inspection and cleaning. If a replacement of the printing head or printer plate will be necessary, the replacement can take place without the need of special tools only by loosening two screws 30, which are easily accessable.

The support 21 has the design which appears from FIGS. 6 and 7 and comprises a front portion 23 having a relatively large downwardly extending surface 24. The surface 24 is provided with a groove 25 having a rectangular cross-section. In a recess 26 in the support there is a distribution card 27. A retainer arm 28 is pivotably attached to the back portion of the support 21. Between the printing plate 22 having the printing points, there is adapted a downwardly facing surface 24 of the support so that the printing plate contacs said surface over a great area in order to achieve a good heat dissipation. A guide shoulder 29, which very carefully fits in the groove 25 of the support 21, carefully adjusts the printing plate. The retainer arm abuts the lower surface of the printing plate for urging the printing plate against the surface 24 of the support. The retainer arm 28 is locked in said position by two screws 30.

If the printing plate should be disassembled, the screws 30 are firstly loosened and the support arm 28 is pivoted downwards as shown in FIG. 7. In this position the printing plate is free to be removed. A contact 31 is released, which connects the printing plate to the distribution card 27 and the printing plate is now completely disassembled from the support. The printing plate can now be exchanged against a spare printing plate and the defective printing plate can be discarded or returned to the factory for repair or cleaning or whatever action required.

Since the guide shoulder 29 is positioned immediately above the printing points, the guide shoulder will adjust the printing plate very carefully so that compensation can take place for different thicknesses of printing plates.

There is a guide shoulder 29 for each printing plate 22. Several printing plates and guide shoulders are normally adapted beside each other. Each printing plate is adjusted separately by guide screws 32, which act on each end of the guide shoulder 29 in order to provide that the entire printing plate will be in contact with the printing paper. The printing plates 22 are fixed in the longitudinal direction by means of the shoulder 33 and in the transversal direction by means of springs (not shown) urging the plates towards each other.

Figure 8:
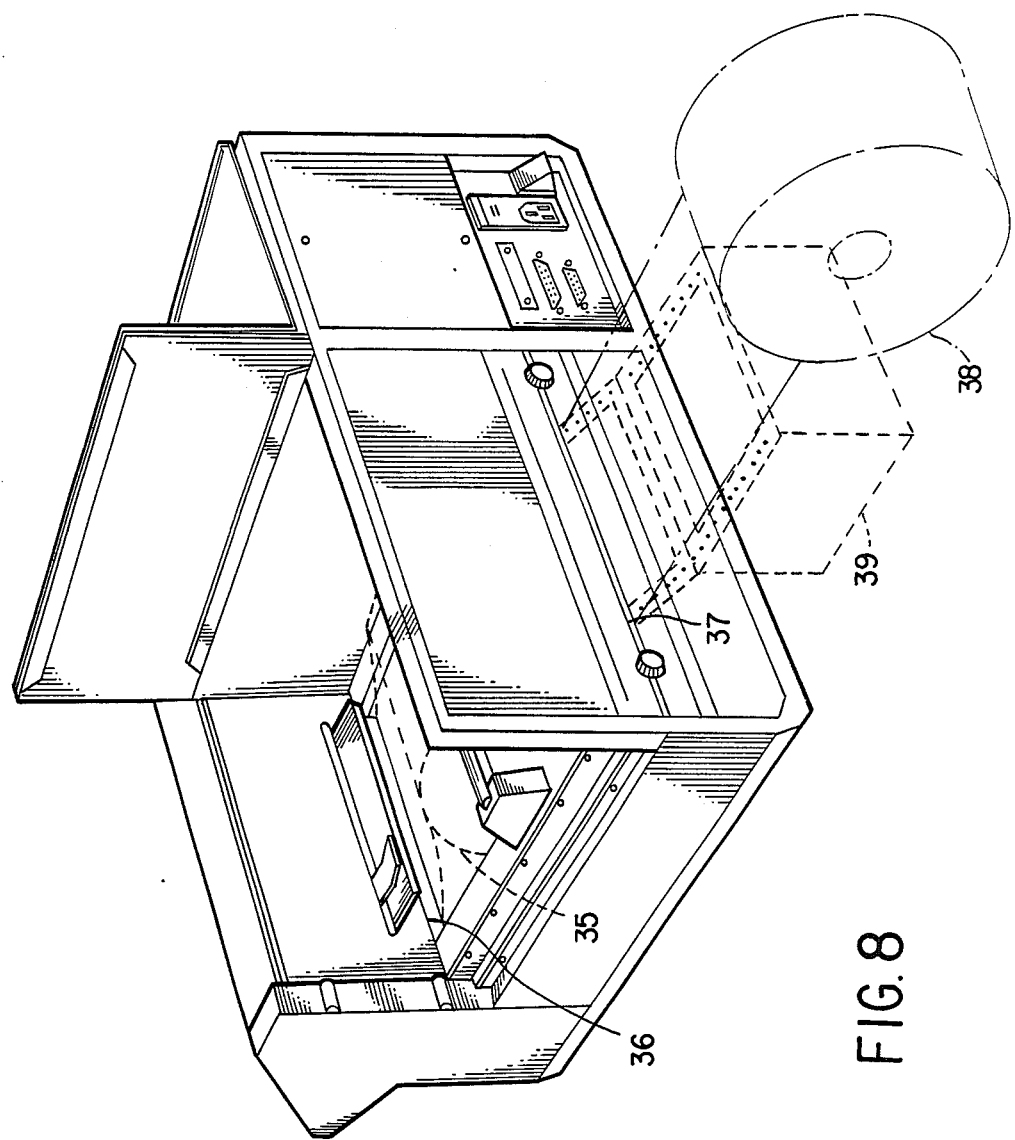
FIG. 8 is a perspective view of the back side of the printer according to the invention.

In FIG. 8 the printer according to FIGS. 1-5 is shown from the back side and in perspective. As appears from FIG. 8 there is room for a big supply roller 35 of labels inside the printer. The labels on the ground paper are inserted through a slit 36 and passes forwards below the printing head.

As furthermore appears from FIG. 8, the back side of the printer is provided with a slot 37, through which the paper can be supplied to the printer from the outside, e.g. from an outer supply roller 38 or a box 39 having folded paper. In this way, the greatest possible flexibility is achieved relative to the paper supply.

At the slit 36 there is a reading fork 40, as more clearly appears from the cross-section according to FIG. 11. The reading fork 40 senses the distance between or the joints between the labels for synchronization of the printing operation and indicates the end of the paper supply.

Figure 9:
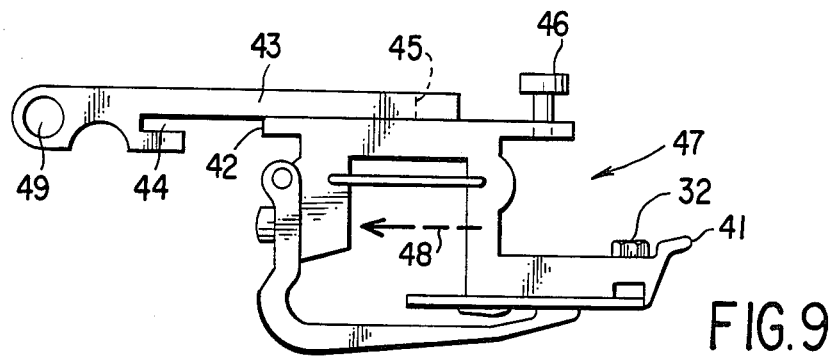
FIGS. 9 and 10 are side view of an alternative embodiment of the support unit of the printing head.
Figure 10:
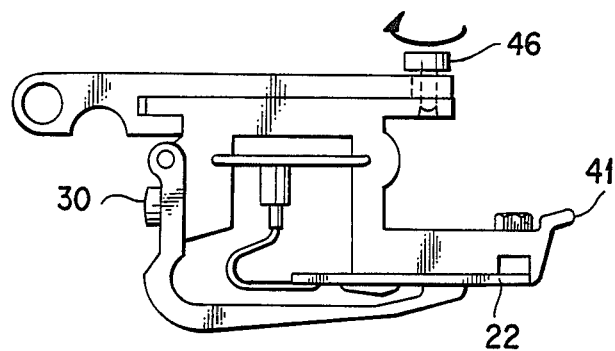

In FIGS. 9 and 10 there is schematically shown a second embodiment of the support for the printing head, which differs from the embodiment of the support according to FIGS. 6 and 7 in certain details. The front portion of the support 47 is provided with a protruding shoulder 41, which is used for lifting the reading head from the labels when no printing takes place. Furthermore, the support according to FIGS. 6 and 7 is mounted by undercut grooves, while the support according to FIGS. 9 and 10 has a side edge 42, which cooperates with a plate 43 attached in the printer as more clearly appears from FIG. 11. The plate 43 is provided with a slot 44, in which the edge 42 fits as shown in FIG. 10. The right border of the plate 43 in FIG. 9 is provided with two U-shaped recesses 45, in which two lock screws fit. The support 47 is inserted in place as indicated by the arrow 48 and is locked by screws 46.

As shown in FIG. 11, the plate 43 is rotatably journalled in the printer by means of a shaft 49. The plate 43 is urged counter-clockwise by means of springs 50 attached to a plate 51, which is pivotably journalled at 52. The plate 51 is locked in the position shown by means of any known locking means 53. If said locking means 53 is released, the plate 51 can be pivoted to the left in FIG. 11 and the plate 43 with the printing head is free to be pivoted upwards to the right over an angle of about 100° to a vertical position, in which the printing points can be cleaned and inspected. Moreover, there is a shaft 54 provided with pins 55 adapted for cooperation with the shoulder 41 of the tip of the support 47. By rotating the shaft 54 about 45° counter-clockwise, the printing points are lifted from the contact with the labels. Said lifting movement is possible due to the springs 50. The lifting movement is performed by means of an electromagnet (not shown) and can be controlled by the program of the printer. Thus, it is possible to lift the printing head between each label in order to prevent that the edges of the label damage or influence on the printing head.

From the description above it appears that a printer fulfilling the objects defined in the introductory portion of the specification has been provided. However, it is realized that the embodiment of the printer described above may be modified in many respects by a skilled person without departing from the scope of the invention. The intention is that such modifications obvious to a skilled person reading this specification should be included within the scope of the invention. The invention is only limited by the appended patent claims.

What I claim is:

1. In a printer for printing on label paper, the printer having a supply of label paper having labels separably mounted on a ground paper, a printing head with a printing plate movable for printing on the label paper, and label-paper feeding means for feeding the label paper from the supply thereof past the printing head for the printing thereof, the improvement for three printing modes comprising:

a winding drawer movable into and outwardly of the printer, an edge of the winding drawer being positioned close to the printer when the winding drawer is moved fully into the printer and spaced sufficiently from the printer for passing out of the printer the label paper which has been fed past the printing head of the printer for printing on the labels thereof;

a winding roller rotatably supported in the winding drawer for winding thereabout at least the ground paper of the printed label paper;

a dispensing edge in the printer for engaging the printed label paper before the winding drawer; and an operation lever pivotedly mounted on the winding drawer for movement to a first and a second position and having a deflection roller on one end, the deflection roller being cooperatively positioned with respect to the dispensing edge when the operation lever has been moved into the first position and the winding drawer has been moved into the printer for separating the ground paper of the label paper from the labels thereof and directing the ground paper to the winding roller for winding thereabout and also directing the printed labels across the dispensing edge to the space between the one edge of the winding drawer and the printer for passing out of the printer, whereby, in a first printing mode, only printed labels are dispensed, and the deflection roller not being cooperatively positioned with respect to the dispensing edge when the operation lever has been moved into the second position and the winding drawer has been moved outwardly of the printer for leaving the labels on the ground paper of the label paper, whereby, in a second printing mode, the label paper including the printed labels is wound onto the winding roller and, regardless of the position of the winding drawer, in a third printing mode, said label paper together with said printed label retained thereon being dispensed as a strip from said printer without being wound onto the winding roller.

2. A printer as claimed in claim 1, wherein the deflection roller deflects the label paper substantially rectilinearly from the dispensing edge when in the first position with the winding drawer moved into the printer for the separating of the ground paper from the labels.

3. A printer as claimed in claim 1, wherein the printing plate is in contact with a large cooling surface for heat dissipation and heat equalization.

4. A printer as claimed in claim 1, wherein several printing plates are beside each other and each is separately adjustable for proper contact with the label paper.

* * * * *